(12) United States Patent
Huang et al.

(10) Patent No.: US 6,937,278 B2
(45) Date of Patent: Aug. 30, 2005

(54) ROW DRIVER CIRCUIT FOR A SENSOR INCLUDING A SHARED ROW-RESET BUS AND A CHARGE PUMP BOOSTING CIRCUIT (75) Inventors: Steve Huang, Arcadia, CA (US); Daniel Van Blerkom, Altadena, CA (US)

(73) Assignee: Micron Technology, Inc., Boise, ID (US)

( * ) Notice: Subject to any disclaimer, the term of this patent is extended or adjusted under 35 U.S.C. 154(b) by 822 days.

(21) Appl. No.: 09/876,848

(22) Filed: Jun. 5, 2001

(65) Prior Publication Data

US 2002/0140689 A1 Oct. 3, 2002

Related U.S. Application Data (60) Provisional application No. 60/281,045, filed on Apr. 2, 2001.

(51) Int. Cl.[7] .................................................. H04N 3/14
(52) U.S. Cl. ........................ 348/304; 348/308; 257/215
(58) Field of Search ................................. 348/302, 304, 348/308, 312; 377/64, 75, 77, 79, 57, 60, 62; 257/215, 229, 231, 242, 252

(56) References Cited

U.S. PATENT DOCUMENTS

| | | | | |
|---|---|---|---|---|
| 5,471,515 A | | 11/1995 | Fossum et al. | |
| 6,140,630 A | * | 10/2000 | Rhodes | 250/208.1 |
| 6,211,510 B1 | * | 4/2001 | Merrill et al. | 250/208.1 |
| 6,618,083 B1 | * | 9/2003 | Chen et al. | 348/243 |
| 6,734,907 B1 | * | 5/2004 | Hagihara et al. | 348/308 |
| 6,768,093 B2 | * | 7/2004 | Miida | 250/208.1 |
| 6,778,213 B1 | * | 8/2004 | Nakashiba | 348/308 |

* cited by examiner

Primary Examiner—Wendy R. Garber
Assistant Examiner—Jacqueline Wilson
(74) Attorney, Agent, or Firm—Dickstein Shapiro Morin & Oshinsky LLP (57) ABSTRACT A row driver according to an embodiment drives a shared row-reset bus to one of a select voltage and a boosted voltage to select a row for readout and to reset the pixels in the row, respectively. The boosted voltage is higher than the select voltage. A row select circuit includes PMOS transistors through which a path may be opened between a supply line carrying the select voltage and the bus. A reset enable circuit includes PMOS transistors through which a path may be opened between a supply line carrying the boosted voltage and the bus. In order to prevent a parasitic diode leakage between the two supply lines during reset, the n-wells of the PMOS transistors in the row select circuit may be coupled to the supply line carrying the boost voltage.

26 Claims, 5 Drawing Sheets

FIG. 6

ROW DRIVER CIRCUIT FOR A SENSOR INCLUDING A SHARED ROW-RESET BUS AND A CHARGE PUMP BOOSTING CIRCUIT

This application claims priority to U.S. Provisional Application Ser. No. 60/281,045, filed on Apr. 2, 2001 and entitled A New Row Driver Circuit For CMOS APS Using Shared Row-Reset Pixels And Charge Pump Boosting Circuit.

BACKGROUND

Active pixel sensor (APS) imaging devices are described in U.S. Pat. No. 5,471,515. These imaging devices include an array of pixel cells, arranged in rows and columns, that convert light energy into electric signals. Each pixel includes a photodetector and one or more active transistors. The transistors typically provide amplification, readout control and reset control, in addition to producing the electric signal output from the cell.

APS devices may be fabricated using complimentary metal oxide semiconductor (CMOS) technology. A CMOS-based APS sensor, including the pixel array and readout structure, may be provided on the same integrated circuit (IC) chip. Such sensors may be used in a variety of devices including, for example, consumer products, such as Internet cameras and digital still cameras, and machine vision systems used in industrial applications.

The pixel array may be read out row-by-row after an exposure. Each row in the array may include a row driver which is used to select pixels in the row for readout and then reset the pixels for a subsequent integration. The row driver may select pixels in the row by outputting a row select signal, equal to Vdd, on a row select bus shared by all of the pixels in the row. The row driver may reset pixels in the row by driving a row reset bus shared by all of the pixels in the row to a boosted reset signal, which is greater than Vdd. Employing a the boosted reset signal may increase the dynamic range of the pixels in the sensor.

SUMMARY

A row driver according to an embodiment drives a shared row-reset bus to one of a select voltage and a boosted voltage to select a row for readout and to reset the pixels in the row, respectively. The boosted voltage is higher than the select voltage.

A row select circuit includes PMS transistors through which a path may be opened between a supply line carrying the select voltage and the bus. A reset control circuit includes PMOS transistors through which a path may be opened between a supply line carrying the boosted voltage and the bus. In order to prevent a parasitic diode leakage between the two supply lines during reset, the n-wells of the PMOS transistors in the row select circuit may be coupled to the supply line carrying the boost voltage.

DETAILED DESCRIPTION

Figure 1:
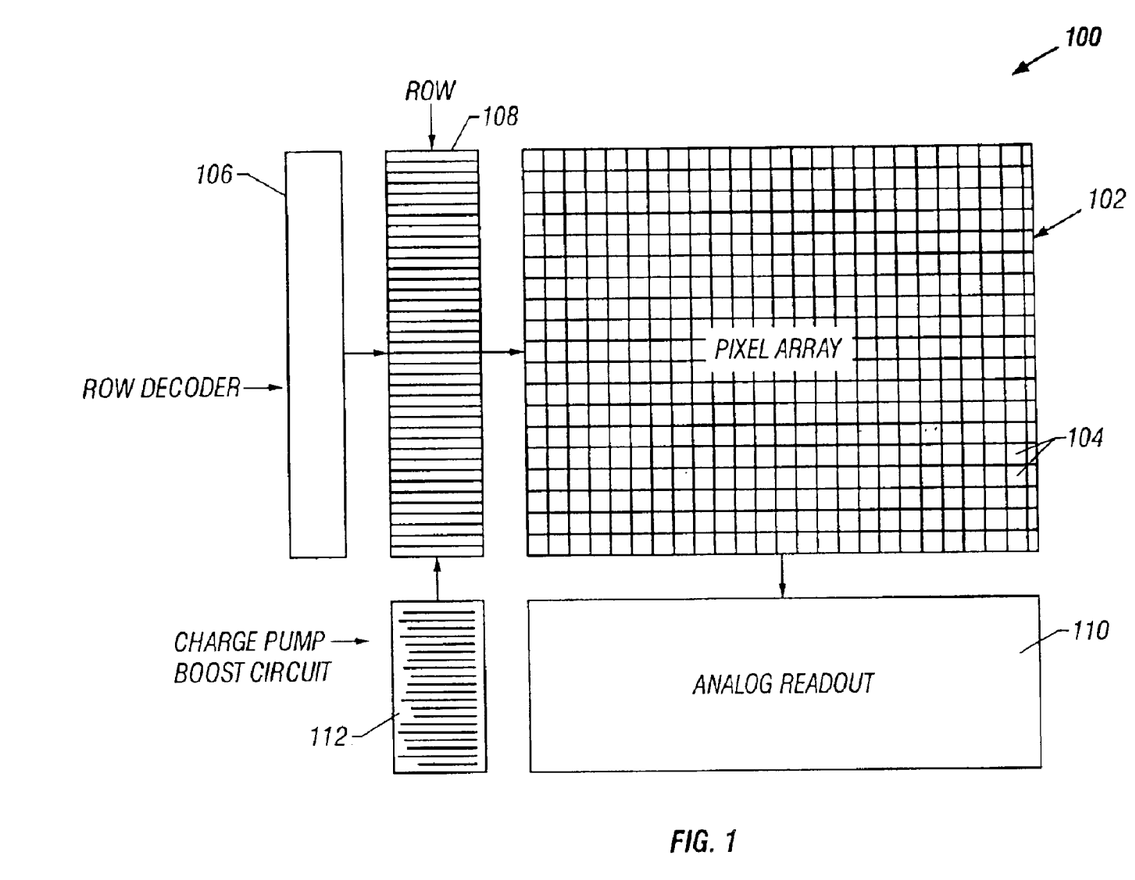
FIG. 1 is a block diagram of a sensor according to an embodiment.

A sensor 100, e.g., an active pixel sensor (APS), according to an embodiment includes a pixel array 102 which includes a grid of individually addressable pixels 104 arranged in rows and columns. A row decoder 106 is used to address a bank of row drivers 108. Each row driver 108 includes circuitry for selecting the pixels in an associated row, enabling the pixels for readout, and resetting the pixels after readout for a subsequent integration. The analog signals read out from pixels in a selected row are stored in a buffer 110, which may include a bank of sample-and-hold circuits, for subsequent analog-to-digital conversion.

A charge pump boost circuit 112 provides the row drivers 108 with a boosted voltage supply and a control signal to boost the reset signal to a voltage higher than Vdd during a row reset operation. In an embodiment, Vdd is approximately 3.3 V and the boosted reset voltage is approximately 4.2 V.

Figure 2:
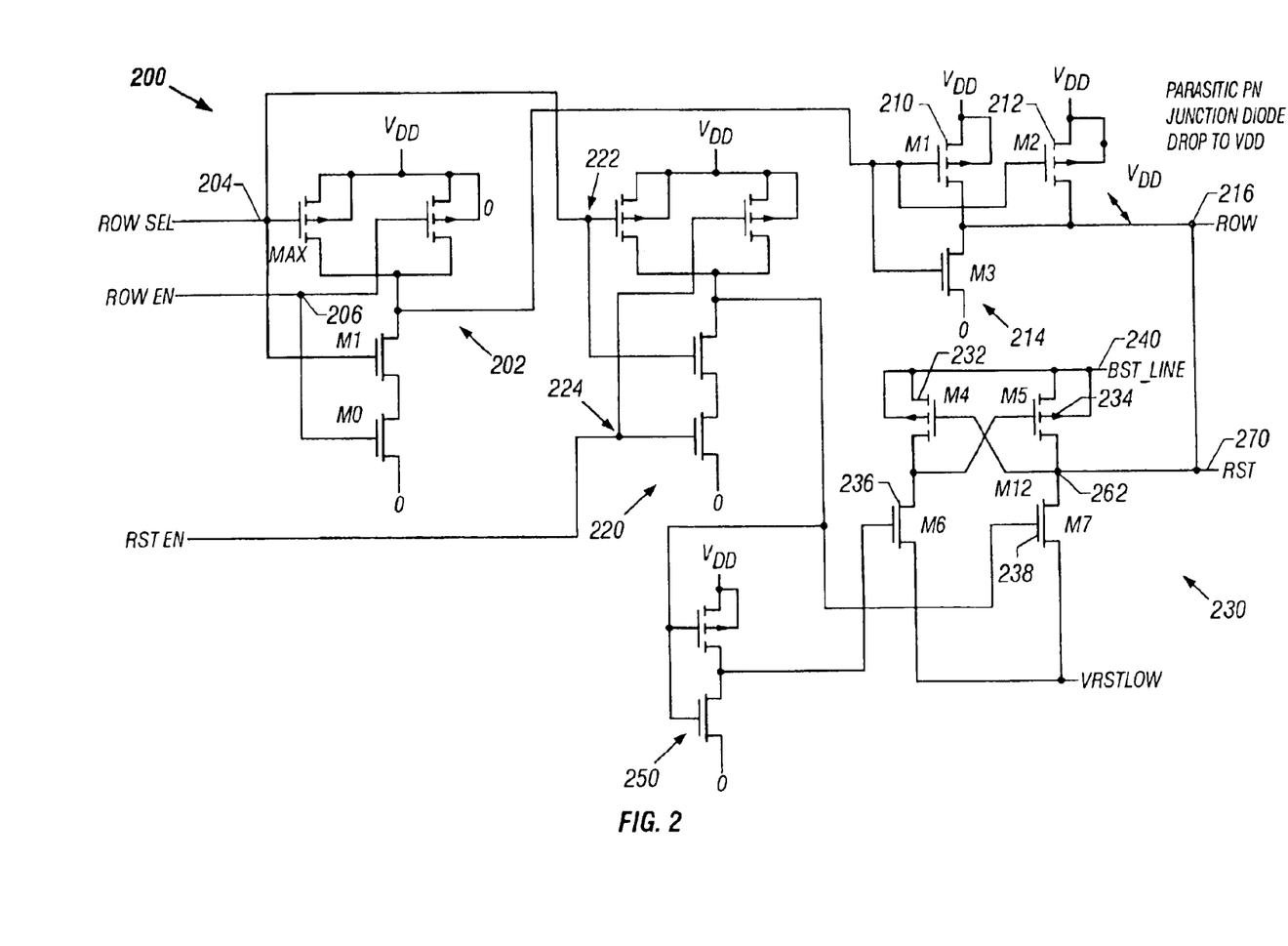
FIG. 2 is schematic diagram of an exemplary row driver.

FIG. 2 illustrates an exemplary row driver 200 used in conjunction with a charge pump boost circuit. A NAND gate 202 includes an input node 204 for receiving a row select signal and an input node 206 for receiving a row enable signal from the row decoder 106. When both the row select and row enable nodes 204, 206 are HIGH, the NAND gate 202 outputs a LOW signal. This LOW signal turns on PMOS transistors 210 and 212 and turns off an NMOS transistor 214, thereby pulling the output node 216 connected to a row select bus HIGH (Vdd), which in the present embodiment is 3.3 V.

A reset NAND gate 220 includes an input node 222 for receiving the row select signal and an input node 224 for receiving a reset enable signal.

A row reset circuit 230 includes a pair of cross coupled PMOS transistors 232, 234, each having a source coupled to a boost voltage line 240, which provides the boosted reset voltage, which in the present embodiment is about 4.2 V. The row reset circuit also includes a pair of NMOS transistors 236, 238, each having a source coupled to $V_{rstlow}$, which in the present embodiment is slightly above 0 V.

When both the row select and reset enable nodes 222, 224 are HIGH, the reset NAND gate 220 outputs a LOW signal. The LOW signal output by the NAND gate 220 turns off NMOS transistor 238. The LOW signal is inverted by a CMOS inverter 250, which outputs a HIGH signal that turns on NMOS transistor 236, opening a path to $V_{rstlow}$. With NMOS transistor 236 conducting, the voltage on node 260 begins to drop, which causes PMOS transistor 234 to turn on, thereby opening a path to the boost voltage line 240. With PMOS transistor 234 ON and NMOS transistor 238 OFF, the voltage at node 262 begins to rise, which begins to turn off PMOS transistor 234. Node 262 is coupled to the bus. When the row reset circuit 230 reaches equilibrium, node 262 is at $V_{boost\_line}$, which is transmitted to the pixels in the row via a row select bus 270.

Figure 3:
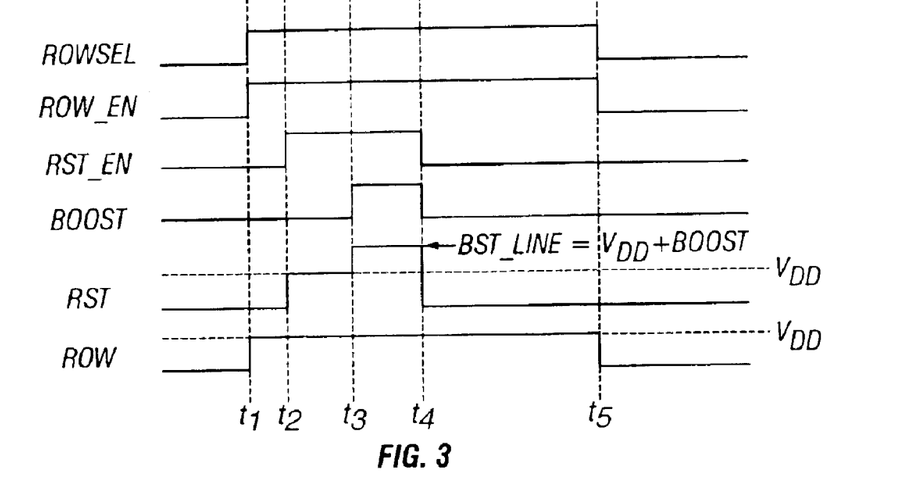
FIG. 3 is a timing diagram for a readout operation for a row of pixels in the sensor.

FIG. 3 illustrates the timing signals and signals on the row select and reset buses during a row readout operation. A row select signal and a row enable signal are input to the row driver at a time $t_1$, which drives the row select bus to Vdd (3.3 V in the present embodiment). A row reset signal is input to the row decoder at a time $t_2$, which drives the row reset bus to the boost voltage line voltage, which at time $t_2$ is Vdd. At a time $t_3$, the control pump boost circuit 112 issues a control signal to the row driver, which boosts the boost voltage line, and hence the row reset voltage, to the boosted reset voltage (4.2 V in the present embodiment). At a time $t_4$, the reset enable and boost signals drop to LOW value, driving the reset bus LOW. At a time $t_5$, the row select and row enable signals drop to a LOW voltage, which pulls the row select bus LOW.

A sensor according to an embodiment has a shared row-reset pixel architecture in which one metal bus is used for both the reset signal for select signal to the pixels in a row. The reset signal for the current pixel is also the select signal for the following pixel in the next row. Because of this shared row-reset architecture, the row driver must be implemented such that it is able to drive both a normal logic row select signal and a boosted row reset signal.

Figure 4:
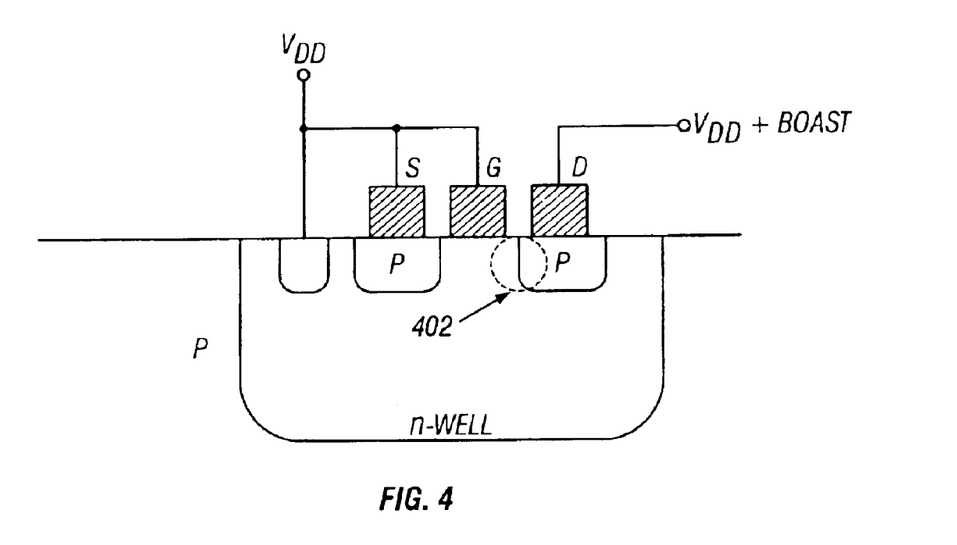
FIG. 4 is a sectional view of a PMOS transistor including a parasitic diode.
Figure 5:
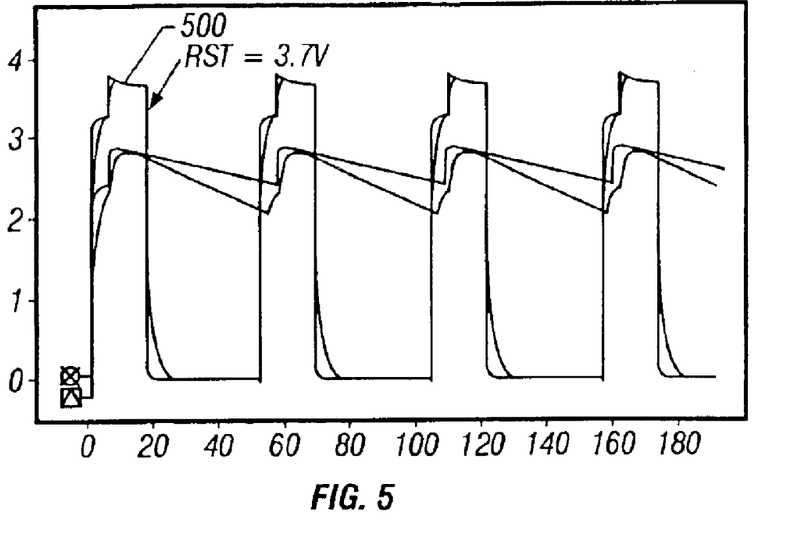
FIG. 5 is a plot of voltages on a shared row reset pixel bus produced by the row driver of FIG. 2 during readout.

In the row driver 200 shown in FIG. 2, combining the row select and row reset buses may produce a parasitic diode leakage of the boosted voltage through the n-well of the PMOS transistors to Vdd. Parasitic diodes are formed as a by-product of the CMOS process. As shown in FIG. 4, the PN junction 402 formed between the p-type region connected to the drain of a PMOS transistor and the n-well creates a parasitic diode. When the boost voltage line 240 is driven to a voltage higher than Vdd, the higher voltage can leak through the n-well to Vdd via the gate connection. This diode leakage cause the boosting voltage 500 to first boost to a high voltage and then slowly drain to a lower voltage, as shown in FIG. 5.

Figure 6:
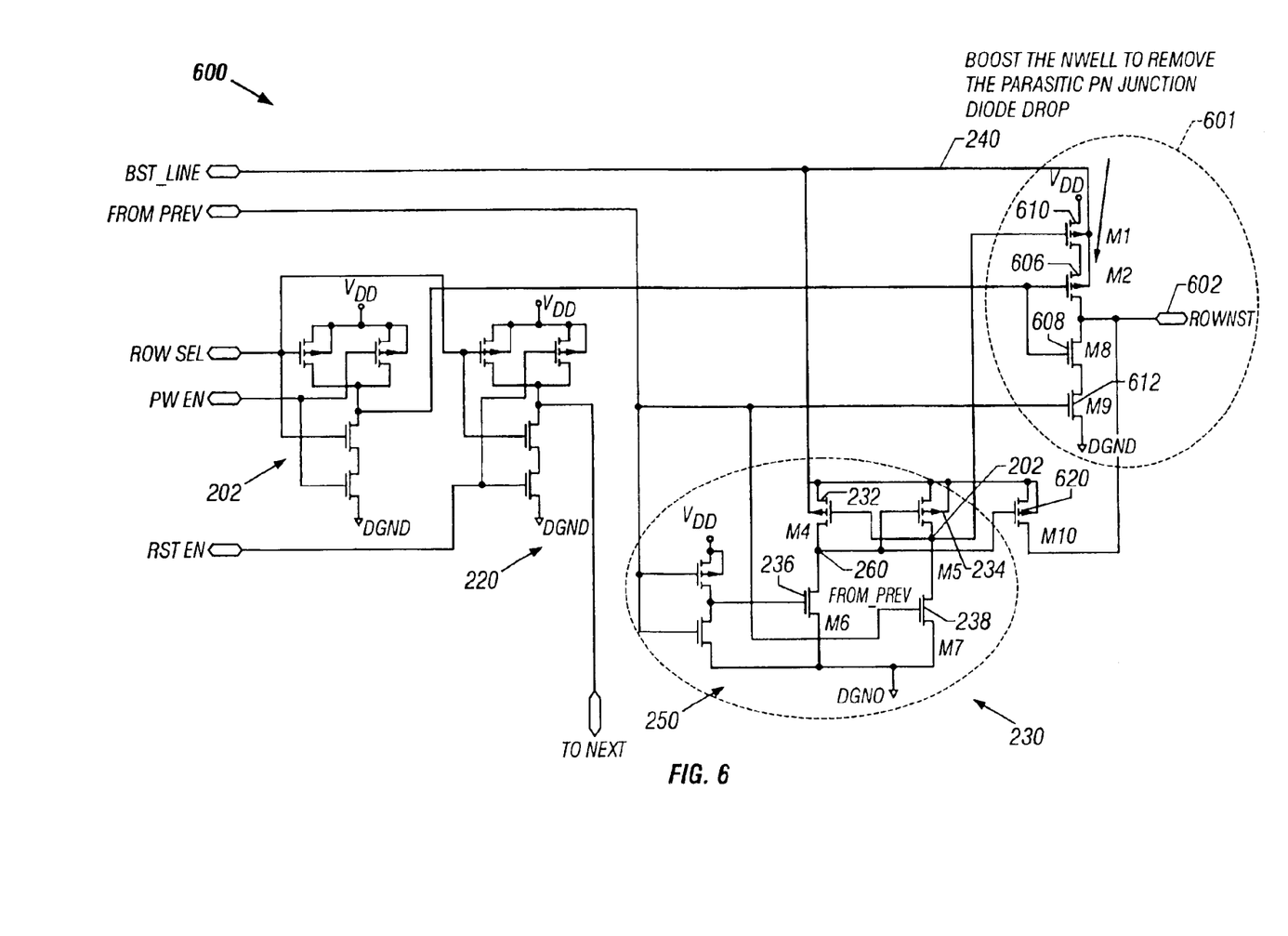
FIG. 6 is a schematic diagram of a row driver including a shared row-reset bus according to an embodiment.

FIG. 6 illustrates a row driver 600 which removes the parasitic diode drop to Vdd by boosting the n-well of the PMOS transistors that drive the shared row-reset bus to the boosted voltage provided by the charge pump boost circuit 112. The row driver 600 includes one bus (ROWNRST) 602 for sending both the row select and reset signals to the pixels in the row. When the row select and row enable signals are HIGH, the output of the NAND gate 202 is LOW, turning on a PMOS transistor 606 and turning off an NMOS transistor 608 in a row select circuit 601, thereby closing the path to ground. An upper PMOS transistor 610 is at the same gate voltage as the PMOS transistor 234 in the reset control circuit 230, which is normally LOW. Consequently, the PMOS transistor 610 is normally ON, opening a path to Vdd. With both PMOS transistors 606 and 610 ON, the bus 602 is pulled to Vdd.

The output of the reset NAND circuit 220 controls the reset control signal of the next row driver. The reset NAND circuit 220 outputs a HIGH signal until the row is selected by the row decoder and both the row select and reset enable signals are HIGH (time $t_2$). At time $t_2$, the reset NAND circuit 220 outputs a LOW signal to the next row driver.

Correspondingly, the reset control circuit of the present row driver is controlled by the output of the reset NAND circuit 220 of the previous row driver, which is normally HIGH. The HIGH signal turns on NMOS transistor 238 and is inverted by the inverter 250 to turn off NMOS transistor 236. At equilibrium, node 260 is HIGH, and node 262 is LOW. Consequently, PMOS transistors 234 and 620 are OFF, and PMOS transistor 232 is ON.

Figure 7:
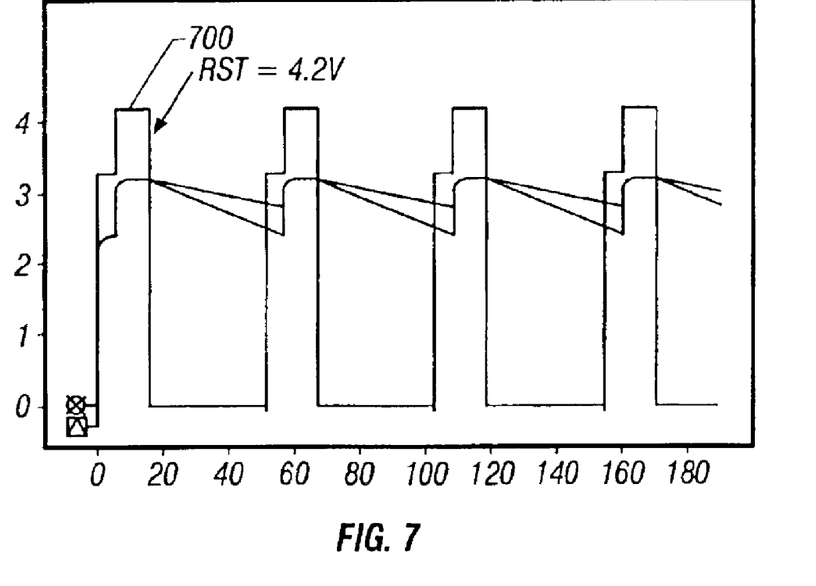
FIG. 7 is a plot of voltages on a shared row reset pixel bus produced by the row driver of FIG. 6 during readout.

When the output of the previous stage reset NAND circuit transitions LOW in response to HIGH row select and reset enable signals, NMOS transistor 236 begins to turn on, and NMOS transistor 238 begins to turn off. As NMOS transistor 236 turns on, the voltage at node 260 begins to drop, and PMOS transistors 234 and 620 begin to turn on. As NMOS transistor 238 turns off, the voltage at node 262 begins to rise, and PMOS transistor 232 and PMOS transistor 610, in the row select circuit 601, begin to turn off. At equilibrium, PMOS transistor 610 is OFF, closing the path to Vdd, and PMOS transistor M10 is ON, opening the path to the boost voltage line 240. The LOW signal output by the previous row driver turns off NMOS transistor 612, closing the path to ground. Thus, the bus 602 is pulled to the voltage on the boost voltage line 240. When the charge pump boost circuit 112 sends the boost pulse, the bus 602 is driven to the boosted voltage. The n-well of both the row select circuit 601 PMOS transistors 610 and 606 are coupled to the boosted voltage line 240, and hence are also driven to the boosted voltage. Accordingly, there is no voltage drop between the drain of PMOS transistor 606 at the bus 602 and the n-well of the transistor. There is little to no parasitic leakage at the PN junction 402 (FIG. 4). FIG. 7 illustrates the improved response of the row driver, in which the reset voltage 700 remains at the boosted voltage.

A number of embodiments have been described. Nevertheless, it will be understood that various modifications may be made without departing from the spirit and scope of the invention. Accordingly, other embodiments are within the scope of the following claims.

What is claimed is:

1. A method comprising:

selecting a row from a plurality of rows in a pixel array;

opening a path between a first line having a first voltage and a bus through one or more row select transistors;

selecting the row for reset;

opening a path between a second line having a second voltage and the bus through one or more reset enable transistors, said second voltage being higher than said first voltage; and providing the second voltage to the one or more row select transistors.

2. The method of claim 1, wherein the one or more row select transistors comprise PMOS transistors, each including an n-well.

3. The method of claim 2, wherein said providing the second voltage to the one or more row select transistors comprises boosting the n-wells of the PMOS transistors to the second voltage.

4. The method of claim 1, wherein the second voltage comprises a boosted reset voltage.

5. A row driver comprising:

a bus;

a first line operative to carry a select voltage;

a second line operative to be driven to a boosted voltage, said boosted voltage being higher than the select voltage; and a first circuit operative to couple the bus to the first line in response to a row select signal, said first circuit including a transistor coupled to the second line, wherein the boosted voltage comprises a reset enable signal.

6. A row driver comprising:

a bus;

a first line operative to carry a select voltage;

a second line operative to be driven to a boosted voltage, said boosted voltage being higher than the select voltage;

a first circuit operative to couple the bus to the first line in response to a row select signal, said first circuit including a transistor coupled to the second line; and a second circuit operative to couple the bus to the second line in response to a row reset signal.

7. A row driver comprising:
a bus;
a first line operative to carry a select voltage;
a second line operative to be driven to a boosted voltage, said boosted voltage being higher than the select voltage; and
a first circuit operative to couple the bus to the first line in response to a row select signal, said first circuit including a transistor coupled to the second line,
wherein the transistor is coupled to the second line such that there is no parasitic diode leakage between the first line and the second line through the transistor in response to the second line being driven to the boosted voltage.

8. The row driver of claim 5, wherein the select voltage comprises Vdd.

9. The row driver of claim 5, wherein the select voltage is about 3.3 volts and the boosted voltage is about 4.2 volts.

10. The row driver of claim 5, wherein the transistor comprises a PMOS transistor including a source connected to the first line and an n-well connected to the second line.

11. The row driver of claim 6, wherein the second circuit is coupled to a bus of another row driver.

12. The row driver of claim 11, wherein the second circuit is operative to couple to the second line to the bus in response to a select signal on the bus of said another row driver.

13. The row driver of claim 6, wherein the second circuit comprises a plurality of PMOS transistors, each PMOS transistor including a source and an n-well coupled to the second line.

14. A row driver comprising:
a bus;
a first line operative to carry a select voltage;
a second line operative to be driven to a boosted voltage, said boosted voltage being higher than the select voltage; and
a first circuit operative to couple the bus to the first line in response to a row select signal, said first circuit including a transistor coupled to the second line,
wherein the bus comprises a shared row-reset bus.

15. A sensor comprising:
a pixel array including a plurality of pixels arranged in rows and columns
a plurality of buses, each bus coupled to pixels in one row of the pixel array;
a first line operative to carry a select voltage;
a second line operative to carry a row enable voltage;
a charge pump boost circuit operative to drive the second line to a boosted voltage, said boosted voltage being higher than the select voltage;
a plurality of row drivers, each row driver coupled to an associated one of the buses and including a first circuit operative to couple said bus to the first line in response to a row select signal, said first circuit including a transistor coupled to the second line, wherein the bus comprises a shared row-reset bus.

16. A sensor comprising:
a pixel array including a plurality of pixels arranged in rows and columns
a plurality of buses, each bus coupled to pixels in one row of the pixel array;
a first line operative to carry a select voltage;
a second line operative to carry a row enable voltage;
a charge pump boost circuit operative to drive the second line to a boosted voltage, said boosted voltage being higher than the select voltage;
a plurality of row drivers, each row driver coupled to an associated one of the buses and including a first circuit operative to couple said bus to the first line in response to a row select signal, said first circuit including a transistor coupled to the second line; and
a second circuit operative to couple the bus to the second line in response to a row reset signal.

17. A sensor comprising:
a pixel array including a plurality of pixels arranged in rows and columns
a plurality of buses, each bus coupled to pixels in one row of the pixel array;
a first line operative to carry a select voltage;
a second line operative to carry a row enable voltage;
a charge pump boost circuit operative to drive the second line to a boosted voltage, said boosted voltage being higher than the select voltage; and
a plurality of row drivers, each row driver coupled to an associated one of the buses and including a first circuit operative to couple said bus to the first line in response to a row select signal, said first circuit including a transistor coupled to the second line,
wherein the transistor is coupled to the second line such that there is no parasitic diode leakage between the first line and the second line through the transistor in response to the second line being driven to the boosted voltage.

18. A sensor comprising:
a pixel array including a plurality of pixels arranged in rows and columns
a plurality of buses, each bus coupled to pixels in one row of the pixel array;
a first line operative to carry a select voltage;
a second line operative to carry a row enable voltage;
a charge pump boost circuit operative to drive the second line to a boosted voltage, said boosted voltage being higher than the select voltage; and
a plurality of row drivers, each row driver coupled to an associated one of the buses and including a first circuit operative to couple said bus to the first line in response to a row select signal, said first circuit including a transistor coupled to the second line.
wherein the boosted voltage comprises a reset enable signal.

19. The sensor of claim 15, wherein the select voltage comprises Vdd.

20. The sensor of claim 15, wherein the select voltage is about 3.3 volts and the boosted voltage is about 4.2 volts.

21. The sensor of claim 15, wherein the transistor comprises a PMOS transistor including a source connected to the first line and an n-well connected to the second line.

22. The sensor of claim 16, wherein the second circuit is coupled to a bus of another row driver.

23. The sensor of claim 22, wherein the second circuit is operative to couple to the second line to the bus in response to a select signal on the bus of said another row driver.

24. The sensor of claim 16, wherein the second circuit comprises a plurality of PMOS transistors, each PMOS transistor including a source and an n-well coupled to the second line.

25. The sensor of claim 15, wherein each pixel comprises an active pixel sensor including a photoreceptor and an in-pixel follower transistor.

26. A method of operating an image sensor comprising:
selecting a row from a plurality of rows in a pixel array;
connecting a first line having a first voltage to a bus through one or more row select transistors;
selecting the row for reset;
connecting a second line having a second voltage to the bus through one or more reset enable transistors, said second voltage being higher than said first voltage; and
providing the second voltage to the one or more row select transistors.

* * * * *

UNITED STATES PATENT AND TRADEMARK OFFICE
CERTIFICATE OF CORRECTION

PATENT NO. : 6,937,278 B2
DATED : August 30, 2005
INVENTOR(S) : Steve Huang et al.

It is certified that error appears in the above-identified patent and that said Letters Patent is hereby corrected as shown below:

<u>Column 1,</u>
Line 38, "Employing a the" should read -- Employing the --.
Line 64, "PMS" should read -- PMOS --.

Signed and Sealed this

Tenth Day of January, 2006

JON W. DUDAS
*Director of the United States Patent and Trademark Office*